(12) United States Patent
Zhang et al.

(10) Patent No.: US 12,191,693 B2
(45) Date of Patent: Jan. 7, 2025

(54) STEP-DOWN CIRCUIT, ELECTRONIC DEVICE, AND STEP-DOWN METHOD

(71) Applicants: GUANGDONG OPPO MOBILE TELECOMMUNICATIONS CORP., LTD., Dongguan (CN); SILERGY SEMICONDUCTOR TECHNOLOGY (HANGZHOU) CO., LTD., Hangzhou (CN)

(72) Inventors: Jialiang Zhang, Dongguan (CN); Shiming Wan, Dongguan (CN); Chen Zhao, Hangzhou (CN); Wang Zhang, Hangzhou (CN)

(73) Assignees: GUANGDONG OPPO MOBILE TELECOMMUNICATIONS CORP., LTD., Dongguan (CN); SILERGY SEMICONDUCTOR TECHNOLOGY (HANGZHOU) CO., LTD., Hangzhou (CN)

( * ) Notice: Subject to any disclaimer, the term of this patent is extended or adjusted under 35 U.S.C. 154(b) by 503 days.

(21) Appl. No.: 17/524,403

(22) Filed: Nov. 11, 2021

(65) Prior Publication Data
US 2022/0069610 A1    Mar. 3, 2022

Related U.S. Application Data

(63) Continuation of application No. PCT/CN2019/086804, filed on May 14, 2019.

(51) Int. Cl.
*H02J 7/00* (2006.01)
*H02M 1/08* (2006.01)
*H02M 3/155* (2006.01)

(52) U.S. Cl.
CPC ........ *H02J 7/00712* (2020.01); *H02J 7/0013* (2013.01); *H02M 1/08* (2013.01); *H02M 3/155* (2013.01)

(58) Field of Classification Search
CPC ...... H02J 7/00712; H02J 7/0013; H02M 1/08; H02M 3/155; H02M 3/33569;
(Continued)

(56) References Cited

U.S. PATENT DOCUMENTS 8,294,432 B2 * 10/2012 Awane ................. H02M 7/217
363/56.02
8,925,841 B2 *  1/2015 Jensen ............... B02C 18/0007
241/36
(Continued)

FOREIGN PATENT DOCUMENTS

CN        1393051 A   *  1/2003  ............. H02J 1/102
CN     200976546 Y     11/2007
(Continued)

OTHER PUBLICATIONS

Notice of Reason for Rejection dated Apr. 27, 2023 from the Korean application No. 10-2021-7037738.
(Continued)

*Primary Examiner* — M Baye Diao
(74) *Attorney, Agent, or Firm* — BAYES PLLC (57) ABSTRACT

A step-down circuit, an electronic device, and a step-down method are disclosed. The step-down circuit includes a positive input terminal and a negative input terminal for receiving an input voltage; and a positive output terminal and a negative output terminal for outputting a target voltage. The negative input terminal and the negative output terminal are grounded together. The step-down circuit also includes a switch circuit, a rectifier circuit, an isolation circuit, and a control unit for outputting control signals to control for turning on or off a switch in the switch circuit and for turning on or off a switch in the rectifier circuit, allowing the input voltage to sequentially pass through the switch in
(Continued)

the switch circuit, a capacitor in the isolation circuit, and the switch in the rectifier circuit to obtain a target voltage.

17 Claims, 6 Drawing Sheets

(58) Field of Classification Search
CPC .... H02M 1/0058; H02M 1/0095; H02M 1/32; H02M 3/072; H02M 3/158; H02M 1/0048; H02M 7/05; H02M 3/07; H02M 3/156; Y02B 70/10
USPC .......................................................... 320/163
See application file for complete search history.

(56) References Cited

U.S. PATENT DOCUMENTS

| | | | |
|---|---|---|---|
| 9,362,826 B2* | 6/2016 | Giuliano | H02M 3/00 |
| 9,397,548 B2* | 7/2016 | Li | H02M 3/06 |
| 9,444,285 B2* | 9/2016 | Kamiya | H02J 7/02 |
| 9,973,081 B1 | 5/2018 | Yin et al. | |
| 10,352,742 B2* | 7/2019 | Li | H03M 1/12 |
| 10,892,682 B2* | 1/2021 | Dilley | H02M 7/797 |
| 11,489,442 B2* | 11/2022 | Choi | H02M 7/4833 |
| 2005/0218829 A1 | 10/2005 | Yadlapalli | |
| 2007/0018622 A1* | 1/2007 | Chen | H02M 3/1588 323/282 |
| 2010/0156366 A1 | 6/2010 | Sakai et al. | |
| 2014/0126154 A1* | 5/2014 | Higuchi | B60L 50/51 361/714 |
| 2015/0349562 A1 | 12/2015 | Minegishi et al. | |
| 2018/0198367 A1 | 7/2018 | Zhang et al. | |
| 2019/0058396 A1* | 2/2019 | Zhang | H02M 1/0095 |
| 2020/0220466 A1* | 7/2020 | Backman | H02M 3/33523 |
| 2021/0344236 A1* | 11/2021 | Yang | H02J 50/90 |

FOREIGN PATENT DOCUMENTS

| | | |
|---|---|---|
| CN | 101702863 A | 5/2010 |
| CN | 101771355 A | 7/2010 |
| CN | 102437741 A | 5/2012 |
| CN | 103457467 A | 12/2013 |
| CN | 105281568 A | 1/2016 |
| CN | 105932725 A | 9/2016 |
| CN | 106655762 A | 5/2017 |
| CN | 106684978 A | 5/2017 |
| CN | 107124101 A | 9/2017 |
| CN | 107422779 A | 12/2017 |
| CN | 107612325 A | 1/2018 |
| CN | 105917546 B | 2/2018 |
| CN | 207530600 U | 6/2018 |
| JP | 2004023993 A | 1/2004 |
| JP | 2017505596 A | 2/2017 |
| KR | 20160121591 A | 10/2016 |
| KR | 20180108555 A | 10/2018 |
| WO | 2016177194 A1 | 11/2016 |
| WO | 2019036091 A1 | 2/2019 |
| WO | 2020206270 A1 | 10/2020 |

OTHER PUBLICATIONS

The Notice of Allowance dated Jun. 6, 2023 from Japanese patent application No. 2021-568437.
First Office Action with Examination Report Dated Jun. 9, 2022 from Indian application No. 202127053376.
Notice of Reasons for Rejection dated Nov. 22, 2022 from the Japanese Application No. 2021-568437.
International Search Report and the Written Opinion Dated Feb. 17, 2020 From the International Searching Authority Re. Application No. PCTCN2019086804, 11 pages.
The Hearing Notice dated Aug. 25, 2023 from Indian patent application No. 202127053376.
The Notice of Allowance dated Oct. 12, 2023 from Korean application No. 10-2021-7037738.
The First Office Action dated Oct. 19, 2023 from Chinese patent application No. 201980094809.6.
Supplementary European search report dated Apr. 19, 2022 from European patent application No. 19929128.7, 11 pages.
He Yiou et al., "Switched tank converter based partial power architecture for voltage regulation applications", 2018 IEEE Applied Power Electronics Conference and Exposition (APEC), IEEE,Mar. 4, 2018 (Mar. 4, 2018), pp. 91-97,XP033347232,DOI: 10.1109/APEC.2018.8340993 [retrieved on Apr. 18, 2018] * abstract; figures 1b, 2a, 2b *.
Baek Jaeil et al.: "LEGO-PoL: A 93.1% 54V-1.5V 300A Merged-Two-Stage Hybrid Converter with a Linear Extendable Group Operated Point-of-Load (LEGO-PoL) Architecture", 2019 20th Workshop on Control and Modeling for Power Electronics (COMPEL), IEEE, Jun. 17, 2019 (Jun. 17, 2019-), pp. 1-8, XP033581279, DOI: 10.1109/COMPEL.2019.8769631 [retrieved on Jul. 22, 2019] * abstract; figures 2, 8-10 *.
The Second Office Action dated Apr. 12, 2024 from Chinese patent application No. 201980094809.6.
The Final Office Action dated Jun. 27, 2024 from Chinese patent application No. 201980094809.6.
The Decision of Reexamination dated Sep. 20, 2024 from Chinese patent application No. 201980094809.6.
The Notice of Allowance dated Sep. 25, 2024 from Chinese patent application No. 201980094809.6.
The Examination Report dated Oct. 8, 2024 from European patent application No. 19929128.7.

* cited by examiner

STEP-DOWN CIRCUIT, ELECTRONIC DEVICE, AND STEP-DOWN METHOD

CROSS-REFERENCE TO RELATED APPLICATION

This application is a continuation of International Application No. PCT/CN2019/086804, filed on May 14, 2019, the entire contents of which are hereby incorporated by reference.

BACKGROUND

The present disclosure relates to the field of charging technology, and specifically to a step-down circuit, an electronic device, and a step-down method.

Currently, electronic devices are more and more favored by consumers, but the electronic devices consume a lot of power and need to be charged to meet the user's demand for the use of electronic devices.

During a charging process, it is generally necessary to set up a conversion circuit to achieve voltage or current conversion and to provide a suitable charging current or charging voltage for a battery. When the conversion circuit is a step-down circuit, if a switch in the step-down circuit fails, the charging voltage that is not suitable for the battery will be directly input to the battery, causing issues of the battery to be damaged and safe to use.

SUMMARY

The embodiments of the present disclosure provide a step-down circuit, an electronic device, and a step-down method to improve safety of the step-down circuit.

The first aspect provides a step-down circuit, which includes a positive input terminal and a negative input terminal for receiving an input voltage; a positive output terminal and a negative output terminal for outputting a target voltage, wherein the negative input terminal and the negative output terminal are grounded together; a switch circuit including at least one switch connected between the positive input terminal and the negative input terminal; a rectifier circuit including at least one switch connected between the positive output terminal and the negative output terminal; an isolation circuit including at least one capacitor connected to the switch in the switch circuit and the switch in the rectifier circuit; and a control unit configured to output control signals to control the switch in the switch circuit to be turned on or off, and to control the switch in the rectifier circuit to be turned on or off, to cause that the input voltage sequentially passes through the switch in the switch circuit, the capacitor in the isolation circuit, and the switch in the rectifier circuit to obtain the target voltage, wherein a voltage value of the target voltage is lower than a voltage value of the input voltage.

In a second aspect, an electronic device is provided and includes the step-down circuit as mentioned above.

A third aspect provides a step-down method, which includes receiving an input voltage via a positive input terminal and a negative input terminal; outputting control signals to control one or more switches in a switch circuit to be turned on or off and to control one or more switches in a rectifier circuit to be turned on or off, to cause that the input voltage sequentially passes through the one or more switches in the switch circuit, the capacitor in the isolation circuit, and the one or more switches in the rectifier circuit to obtain a target voltage, wherein a voltage value of the target voltage is lower than a voltage value of the input voltage; outputting the target voltage via a positive output terminal and a negative output terminal, wherein the negative input terminal and the negative output terminal are grounded together; the switch circuit includes at least one switch connected between the positive input terminal and the negative input terminal; the rectifier circuit includes at least one switch connected between the positive output terminal and the negative output terminal; and the isolation circuit includes at least one capacitor connected to the switches in the switch circuit and the switches in the rectifier circuit.

In the step-down circuit of the embodiment of the present disclosure, safety of the step-down circuit can be improved by providing the isolation circuit. In addition, because the negative input terminal and the negative output terminal are grounded together, the system voltage can be referred to each other and can be driven based on the same signal source and control the conduction state of the switch circuit and the rectifier circuit, to cause that driving control of the switch circuit and the rectifier circuit is simpler, and cost of the driving control is reduced.

BRIEF DESCRIPTION OF THE DRAWINGS

To explain the embodiments of the present disclosure or the technical solutions in the prior art more clearly, the drawings that need to be used in the description of the embodiments or the prior art will be briefly introduced as follows. Obviously, drawings in the following description are only some embodiments of the present disclosure. For those of ordinary skill in the art, the drawings of other embodiments can be obtained, according to these drawings, without creative work.

DETAILED DESCRIPTION

To facilitate understanding of the present disclosure, the present disclosure will be described more comprehensively with reference to relevant drawings as follows. Some embodiments of the present disclosure are shown in the drawings. However, the present disclosure can be implemented in many different forms and is not limited to the embodiments described herein. On the contrary, the purpose of providing these embodiments is to make the understanding of the present disclosure more thorough and comprehensive.

To make objectives, technical solutions, and advantages of the present disclosure clearly understand, the present disclosure is further described in detail with reference to the accompanying drawings and embodiments as follows. It should be understood that specific embodiments described herein are only used to explain the present disclosure and are not used to limit the present disclosure.

The present disclosure provides a step-down circuit, which can be applied to an electronic device. The electronic devices can be a mobile terminal, a tablet computer, a personal digital assistant (PDA), a point of sale (POS), an on-board computer, a wearable device, an e-book, a mobile power supply, or the like that is a device can receive power charged by an external power supply.

In some embodiments, the step-down circuit is provided with multi-sets of switches. To avoid safety risks caused by failure of the switches, a capacitor for isolation can be provided in the step-down circuit. By the time-sharing and segmented control of multi-sets of switches turning on and off alternately, the capacitor is charged and discharged intermittently, thereby realizing power transfer and voltage conversion.

Figure 1:
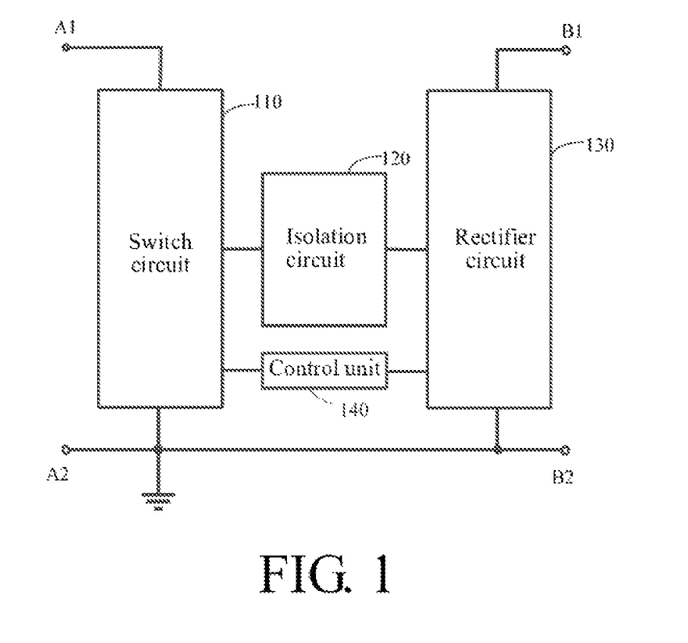
FIG. 1 is a structural schematic diagram of a step-down circuit in an embodiment.

As shown in FIG. 1, in one embodiment, the step-down circuit 100 includes a positive input terminal A1, a negative input terminal A2, a switch circuit 110, an isolation circuit 120, a rectifier circuit 130, a control unit 140, a positive output terminal B1, and a negative output terminal B2.

The positive input terminal A1 and the negative input terminal A2 are used to receive an input voltage. The positive output terminal B1 and the negative output terminal B2 are used to output a target voltage. In an embodiment of the present disclosure, the negative input terminal A2 and the negative output terminal B2 are grounded together. When the negative input terminal A2 and the negative output terminal B2 are grounded together, i.e., connected to a same ground, a system voltage can be referenced to each other, and the switch circuit 110 and the rectifier circuit 130 can be driven and controlled to turn on and off according to a same signal source. Compared with the negative input terminal A2 and the negative output terminal B2 not grounded together, grounded together can make driving control of the switch circuit 110 and the rectifier circuit 130 simpler and reduce cost of the driving control.

The switch circuit 110 includes at least one switch connected between the positive input terminal A1 and the negative input terminal A2. The rectifier circuit 130 includes at least one switch connected between the positive output terminal B1 and the negative output terminal B2.

The isolation circuit 120 includes at least one capacitor connected to the switch in the switch circuit 110 and the switch in the rectifier circuit 130.

The control unit 140 is used to output control signals, to control the switch in the switch circuit 110 on or off, and to control the on or off of the switch in the rectifier circuit 130 on or off, to cause that an input voltage can sequentially pass through the switch in the switch circuit 110, the capacitor in the isolation circuit 120, and the switch in the rectifier circuit 130 to obtain a target voltage. A voltage value of the target voltage is lower than a voltage value of the input voltage.

In the embodiments of the present disclosure, because the isolation circuit 120 is provided, the input voltage will sequentially pass through the switch in the switch circuit 110, the capacitor in the isolation circuit 120, and the rectifier circuit 130 to be outputted. The capacitor has characteristics of passing alternating current and blocking direct current. When the switch in the switch circuit 110 is broken down or fails, the capacitor can prevent a charging input voltage received in the switch circuit 110 from being output to the rectifier circuit 130, thereby that safety of the step-down circuit can be improved. When the positive output terminal B1 and the negative output terminal B2 are connected to a load, the load can be protected.

In an embodiment, switches of the rectifier circuit 130 can be controlled, in turn, conversion performance of the rectifier circuit 130 can be controlled.

As mentioned above, the negative input terminal A2 and the negative output terminal B2 are connected to the same ground. The switches in the switch circuit 110 and the switches in the rectifier circuit 130 can simultaneously receive control signals to control a conduction state of respective switches so that the target voltage outputted via the positive output terminal B1 and the negative output terminal B2 is lower than the input voltage of the step-down circuit.

Figure 2:
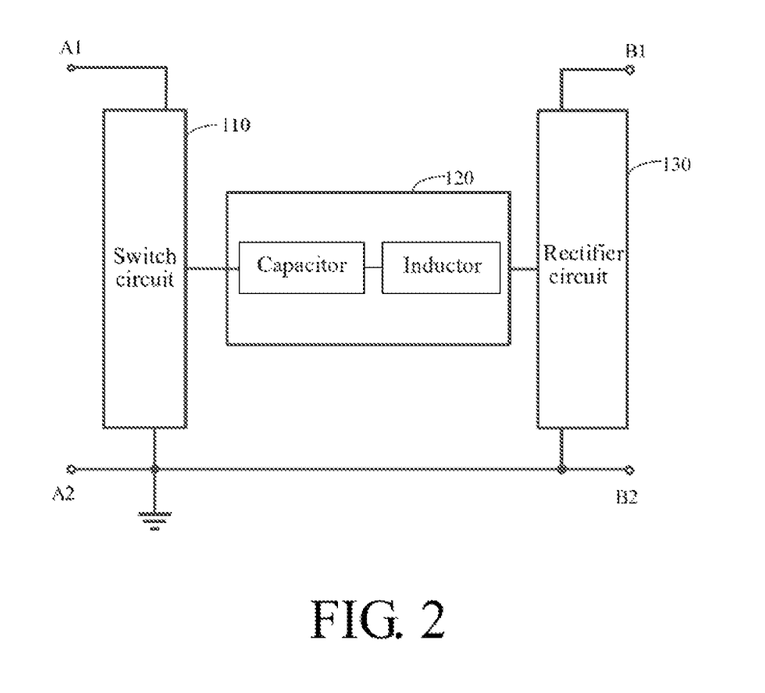
FIG. 2 is a structural schematic diagram of a step-down circuit in another embodiment.

As shown in FIGS. 1 and 2, in an embodiment of the present disclosure, the isolation circuit 120 further includes at least one inductor, which is connected to at least one capacitor in series. It should be understood that each of the capacitors in the isolation circuit may be connected to an inductor in series, or a part of the capacitors in the isolation circuit may be connected to the inductor in series. By connecting the inductor and the capacitor in series, a peak current of the capacitor can be limited, and safety of the step-down circuit can be further improved.

Figure 3:
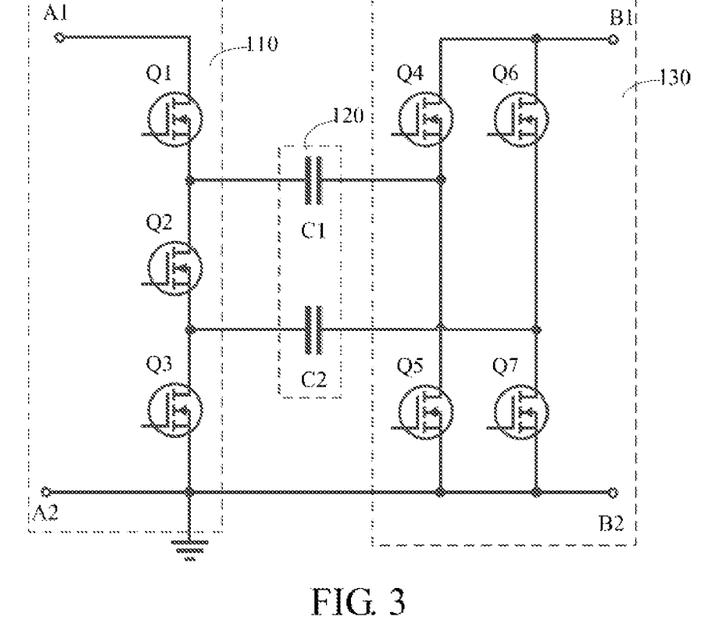
FIG. 3 is a structural schematic diagram of a step-down circuit in one embodiment.

As shown in FIGS. 1 and 3, in an embodiment of the present disclosure, the switch circuit 110 includes a first switch Q1, a second switch Q2, and a third switch Q3 connected in series. Each of the first switch Q1, the second switch Q2, and the third switch Q3 includes a control terminal, an input terminal, and an output terminal.

The first switch Q1, the second switch Q2, and the third switch Q3 connected in series are sequentially connected in series between the positive input terminal A1 and the negative output terminal B1. Specifically, the input terminal of the first switch Q1 is connected to the positive input terminal A1, the output terminal of the second switch Q2 is connected to the input terminal of the third switch Q3 via the second switch Q2, and the output terminal of the third switch Q3 is connected to the positive output terminal A2, the output terminal of the first switch Q1 is connected to the isolation circuit 120 to form a first transmission link, and the output terminal of the second switch Q2 is connected to the isolation circuit 120 to form a second transmission link.

Each of the control terminal of the first switch Q1, the control terminal of the second switch Q2, and the control terminal of the third switch Q3 is used to receive the control signals of the control unit 140, as shown in FIGS. 1 and 3. Under control of the control signals, the first switch Q1, the second switch Q2, and the third switch Q3 can be in an on state or a off state. The first switch Q1 and the third switch Q3 receive the same control signal simultaneously, and the second switch Q2 and the first switch Q1 receive different and opposite control signals simultaneously. Namely, at the same time, if the first switch Q1 and the third switch Q3 are in the on state, the second switch Q2 is in the off state; if the first switch Q1 and the third switch Q3 are in the off state, the second switch Q2 is in the on state.

It should be noted that, in the embodiments of the present disclosure, the first switch Q1, the second switch Q2, and the third switch Q3 can use various existing electrically controllable switching devices, for example, a three-terminal controllable switching device, such as a metal oxide semiconductor field effect transistor (MOSFET), a bipolar junction transistor (BJT), or an insulated gate bipolar transistor (IGBT).

In one embodiment, the isolation circuit 120 includes a first capacitor C1 and a second capacitor C2, wherein a first end of the first capacitor C1 is connected to a common connection node between the first switch transistor Q1 and the second switch transistor Q2, and a second end of the first capacitor C1 is connected to the rectifier circuit 130; a first end of the second capacitor C2 is connected to a common connection node between the second switch Q2 and the third switch Q3, and a second end of the second capacitor C2 is connected to the rectifier circuit 130.

The first switch Q1, the second switch Q2, the third switch Q3, the first capacitor C1, and the second capacitor C2 can convert a received charging signal into an alternating current signal and output the alternating current signal to the rectifier circuit 130. Because the first capacitor C1 and the second capacitor C2 have the characteristics of passing alternating current and blocking direct current, when the switches in the switch circuit 110 is broken down or fails, the first capacitor C1 and the second capacitor C2 can prevent the charging signal received by the switch circuit 110 to be outputted to the rectifier circuit 130, thereby improving the safety of the step-down circuit.

In one embodiment, the rectifier circuit 130 is a full-bridge rectifier circuit, which includes a fourth switch Q4, a fifth switch Q5, a sixth switch Q6, and a seventh switch Q7. The rectifier circuit 130 can be used to convert a received alternating current signal into a direct current signal. Each of the fourth switch Q4, the fifth switch Q5, the sixth switch Q6, and the seventh switch Q7 includes a control terminal, an input terminal, and an output terminal.

The fourth switch Q4 and the fifth switch Q5 are connected in series between the positive output terminal B1 and the output terminal B2. The sixth switch Q6 and the seventh switch Q7 are connected in series between the positive output terminal B1 and the negative output terminal B2. The other end of the first capacitor C1 is connected to a common connection node between the fourth switch Q4 and the fifth switch Q5. The other end of the second capacitor C2 is connected to a common connection node between the sixth switch Q6 and the seventh switch Q7.

Each of the control terminal of the fourth switch Q4, the control terminal of the fifth switch Q5, the control terminal of the sixth switch Q6, and the control terminal of the seventh switch Q7 is used to receive the control signals of the control unit 140. Under control of the control signals, the fourth switch Q4, the fifth switch Q5, the sixth switch Q6, and the seventh switch Q7 can be turned the on or off state.

In one embodiment, the fourth switch Q4, the fifth switch Q5, the sixth switch Q6, and the seventh switch Q7 are metal oxide semiconductor field effect transistors (MOS transistors).

In this embodiment, the rectifier circuit 130 uses four switches, and the negative output terminal B2 of the rectifier circuit 130 is grounded, that is, the fourth switch Q4, the fifth switch Q5, the sixth switch Q6, and the seven switch Q7 have the same reference ground. The fourth switch Q4, the fifth switch Q5, the sixth switch Q6, and the seventh switch Q7 can be controlled to be turned on or off simultaneously, thereby simplifying control and driving. At the same time, the switches in the rectifier circuit 130 can operate in a weak current state, thereby reducing risk of breakdown and improving reliability. At the same time, due to the isolation circuit, an on-resistance of each of the switches in the switch circuit 110 and the rectifier circuit 130 can be made very low and can reduce heat generation and loss, thereby improving energy transfer efficiency of the entire step-down circuit.

In an embodiment, the control signals received by the first switch Q1, the third switch Q3, the fourth switch Q4, and the seventh switch Q7 are opposite to the control signals received by the second switch Q2, the fifth switch Q5, and the sixth switch Q6. Namely, at the same time, when the first switch Q1, the third switch Q3, the fourth switch Q4, and the seventh switch Q7 are in the on state, the second switch Q2, the fifth switch Q5, and the second switch Q5 are in the off state. Alternatively, when the first switch Q1, the third switch Q3, the fourth switch Q4, and the seventh switch Q7 are in the off state, the second switch Q2, the fifth switch Q5, The sixth switch Q6 is in the on state.

For example, the step-down circuit has a state, in which the first switch Q1, the third switch Q3, the fourth switch Q4, and the seventh switch Q7 are in the on state, and the second switch Q2, the fifth switch Q5, and the sixth switch Q6 are in the off state, is called a first operating state. Correspondingly, the step-down circuit has a state, in which the first switch Q1, the third switch Q3, the fourth switch Q4, and the seventh switch Q7 are in the off state, and the second switch Q2, the fifth switch Q5, and the sixth switch Q6 are in the on state, is called a second operating state.

Figure 4:
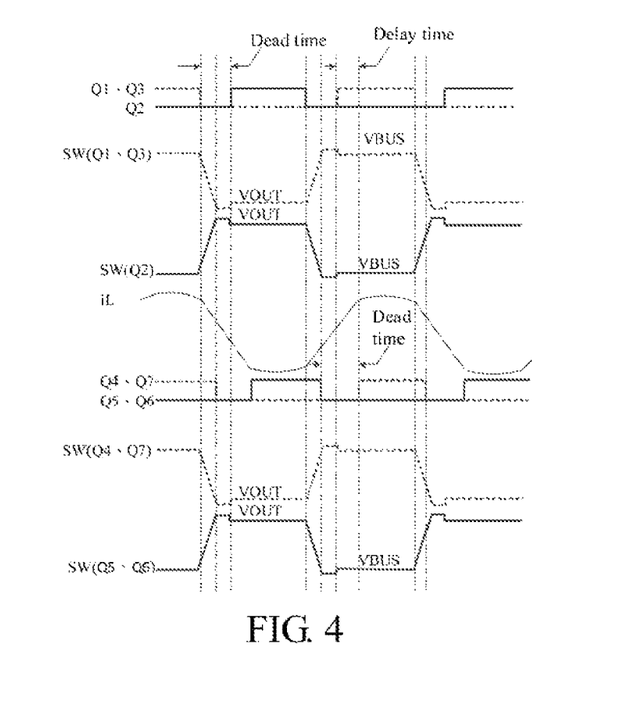
FIG. 4 is an operating timing diagram of a step-down circuit in one embodiment.

As shown in FIG. 4, in an embodiment, the time of the step-down circuit in the first operating state and the second operating state being the same is taken as an example for description. The control signal received by the first switch Q1, the third switch Q3, the fourth switch Q4, and the seventh switch Q7 is a first control signal. The control signal received by the second switch Q2, the fifth switch Q5, and the sixth switch Q6 is a second control signal.

It should be noted that duty cycles of the first control signal and the second control signal can be adjusted for testing the step-down circuit to make the step-down circuit operate in an optimal state.

In an embodiment of the present disclosure, the control signals output by the control unit 140 are pulse width modulation (PWM) signals. The control unit 140 delays for a predetermined duration before outputting the PWM signals each time. The predetermined duration is a protection period to avoid a problem of out of synchronization caused by the different switching speeds of the switches in the switch circuit 110 and the rectifier circuit 130.

Namely, in an embodiment of the present disclosure, the first control signal and the second control signal may also have a certain dead time. The dead time can be implemented by the control unit 140 delaying a predetermined duration before outputting the PWM signals.

Figure 5:
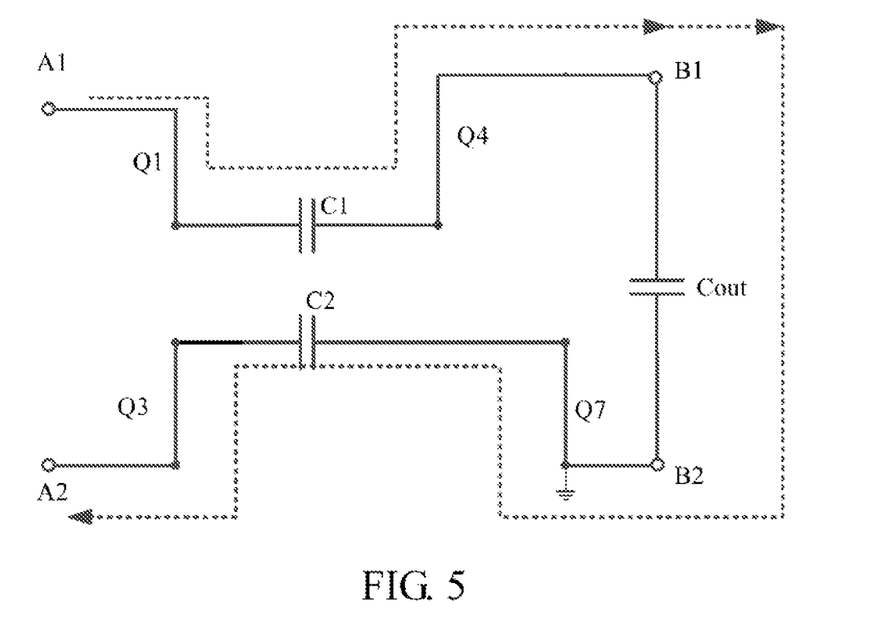
FIG. 5 is an equivalent circuit diagram of a step-down circuit in one embodiment in a first operating state.

FIG. 5 is an equivalent circuit diagram of the step-down circuit in one embodiment in the first operating state. In the first operating state, the first control signal can be understood as a high-level signal, and the second control signal can be understood as a low-level signal. As a result, the first switch Q1, the third switch Q3, the fourth switch Q4, and the seventh switch Q7 are in the on state. The second switch Q2, the fifth switch Q5, and the sixth switch Q6 are in the off state. At this time, a current path corresponding to the equivalent circuit passes through the positive input terminal A1, the first switch Q1, the first capacitor C1, the fourth switch Q4, the positive output terminal B1, the negative output terminal B2, the seventh switch Q7, and the second capacitor C2, the third switch Q3, and the negative input terminal A2. At this time, the first capacitor C1 and the second capacitor C2 are connected in series. The first capacitor C1 and the second capacitor C2 can be charged via the positive input terminal A1 and the negative input terminal A2. Also, a load connected to the positive output terminal B1 and the negative output terminal B2 can be discharged through the first capacitor C1 and the second capacitor C2. Thus, the output target voltage Vout+Vc1+Vc2=Vin, where Vc1 is a voltage across two ends of the first capacitor C1, Vc2 is s voltage across two ends of the second capacitor C2, and Vin is an input voltage.

Figure 6:
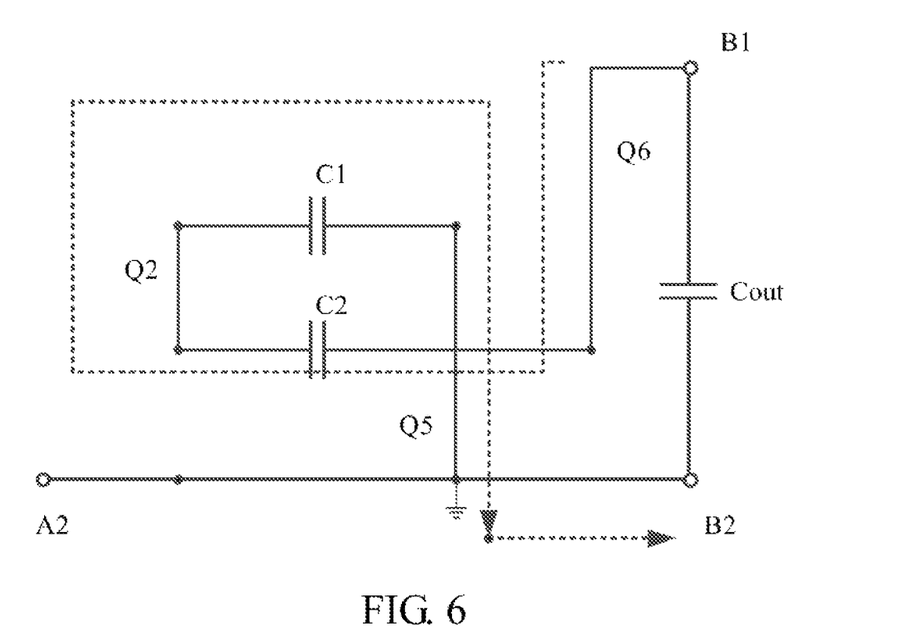
FIG. 6 is an equivalent circuit diagram of a step-down circuit in one embodiment in a second operating state.

FIG. 6 is an equivalent circuit diagram of the step-down circuit in a second operating state in one embodiment. In the second operating state, the first control signal can be understood as a low-level signal, and the second control signal can be understood as a high-level signal. Thus, the first switch Q1, the third switch Q3, the fourth switch Q4, and the seventh switch Q7 are in the off state. The second switch Q2, the fifth switch Q5, and the sixth switch Q6 are in the on state. At this time, a current path corresponding to the equivalent circuit passes through the positive output terminal B1, the sixth switch Q6, the second capacitor C2, the second switch Q2, the first capacitor C1, the fifth switch Q5, and the negative output terminal B2. At this time, the first capacitor C1 and the second capacitor C2 are connected in series, and the load connected to the positive output terminal B1 and the negative output terminal B2 can be discharged through the first capacitor C1 and the second capacitor C2. Therefore, the target voltage Vout=Vc1+Vc2, wherein Vc1 is the voltage across the two ends of the first capacitor C1, and Vc2 is the voltage across the two ends of the second capacitor C2.

Because a time period of the first operating state and the second operating state is relatively short, and a capacitive load or an output capacitor Cout will hinder a voltage change, the voltages Vc1 and Vc2 in the second operating state do not change relative to the first operating state. Namely, $$Vout+Vc1+Vc2=2Vout=Vin$$

Because the target voltage Vout will not change significantly in the two operating states, the target voltage Vout outputted by the step-down circuit can be maintained at about ½ of the input voltage Vin, thereby realizing the step-down isolation conversion.

Figure 7:
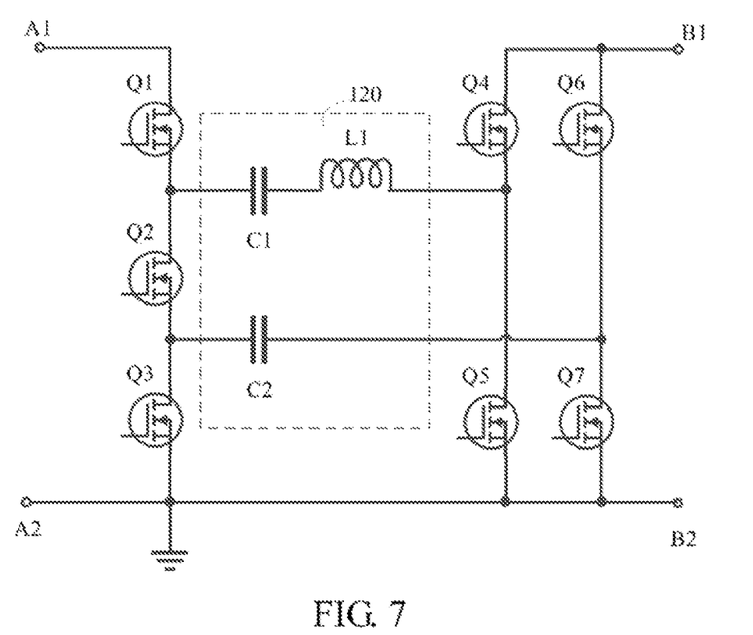
FIG. 7 is a structural schematic diagram of a step-down circuit in one embodiment.

As shown in FIGS. 1 and 7, the isolation circuit 120 includes an inductor L1, that is, the inductor L1 may be connected to the first capacitor C1 in series. Optionally, the inductor L1 can also be connected to the second capacitor C2 in series.

Figure 8:
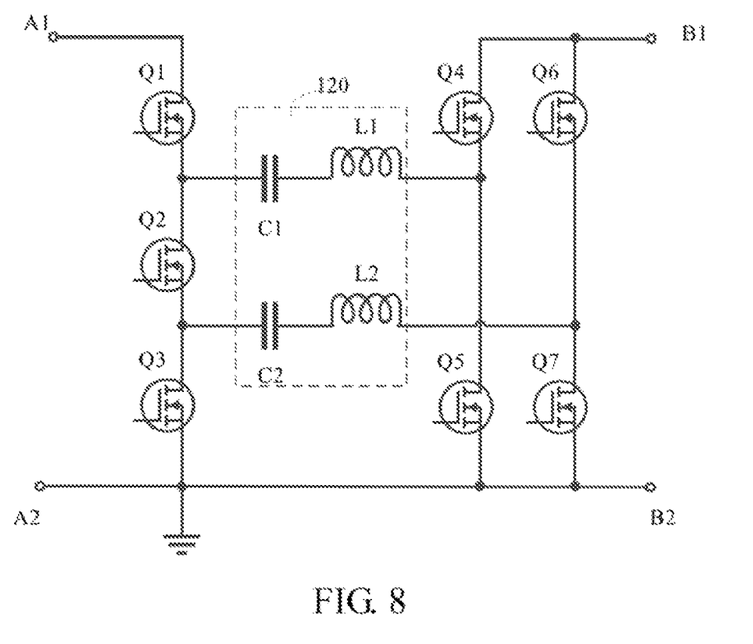
FIG. 8 is a structural schematic diagram of a step-down circuit in one embodiment.

As shown in FIGS. 1 and 8, the isolation circuit 120 may include a first inductor L1 and a second inductor L2, wherein the first inductor L1 is connected to the first capacitor C1 in series, and the second inductor L2 is connected to the second capacitor C2 in series.

In this embodiment, by adding the inductor connected to the first capacitor and/or the second capacitor in series in the isolation circuit 120, and by adding a specific frequency inductance to resonate with the first capacitor C1 and/or the second capacitor C2, the peak current of the capacitor C1 and/or the second capacitor C2 can be restricted.

Referring to FIG. 4, an iL is a waveform of a current flowing through the inductor. The waveform of the current flowing through the inductor is not a square wave, but is similar to a sine wave. At the same time, each electronic switch can operate in a weak current (close to zero current) state, which will reduce heat generation and switching loss, thereby improving the energy transfer efficiency of the entire step-down circuit.

Figure 9:
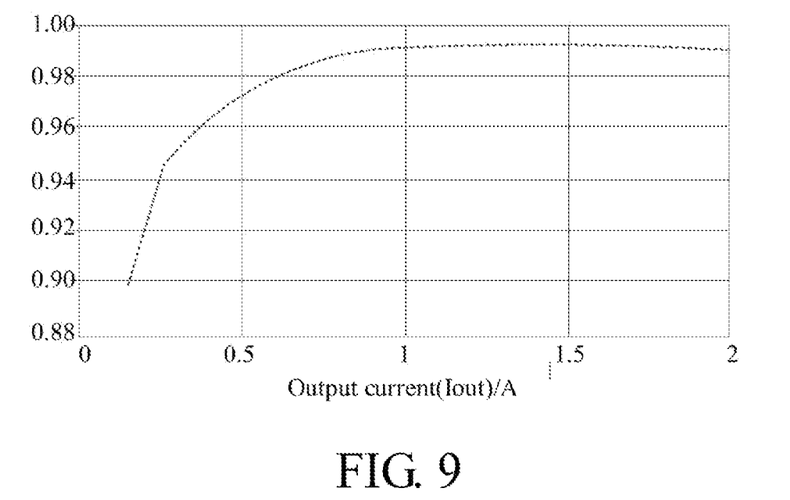
FIG. 9 is an efficiency conversion diagram of a step-down circuit in one embodiment.

As shown in FIG. 9, compared with the related technology, a converting efficiency of the step-down circuit of embodiments of the present disclosure can reach about 99%.

In the embodiment of the present disclosure, the control unit 140 may be a CPU, a processor, or other devices with control functions. The control unit 140 can generate or store control signals that control the first switch Q1, the second switch Q2, the third switch Q3, the fourth switch Q4, the fifth switch Q5, the sixth switch Q6, and the seventh switch. Q7 to be turned on or turned off.

Figure 10:
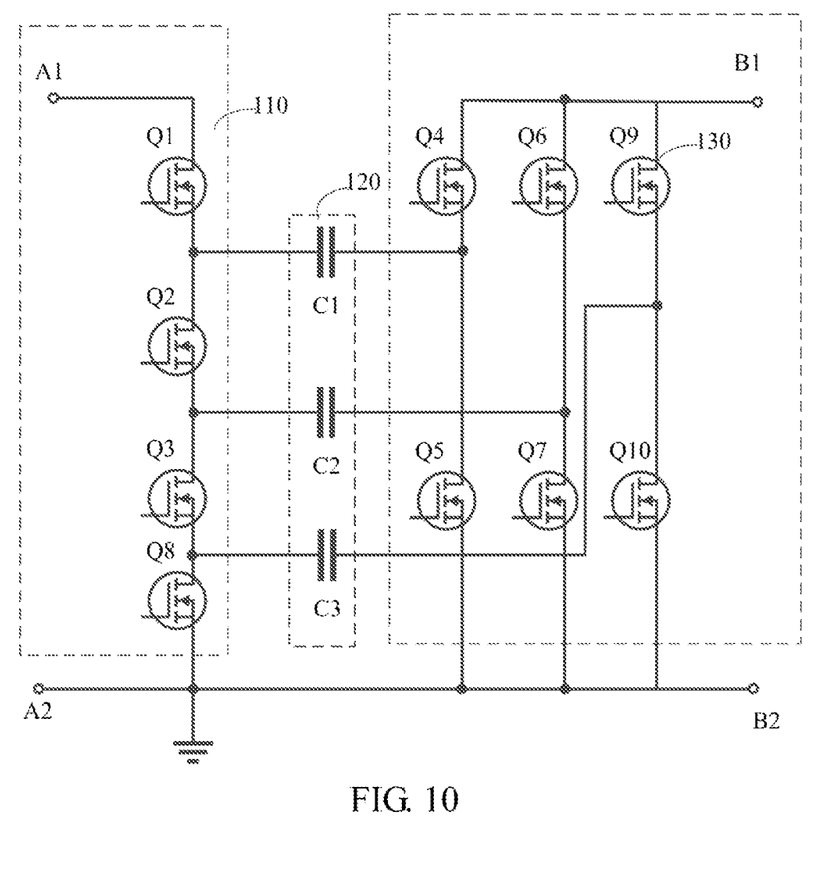
FIG. 10 is a structural schematic diagram of a step-down circuit in one embodiment.

As shown in FIGS. 1 and 10, in another embodiment of the present disclosure, the number of switches in the switch circuit 110 is four, the number of capacitors in the isolation circuit 120 is three, and the number of switches in the rectifier circuit 130 is six. Based on the same principle as the embodiment shown in FIGS. 1 and 3, the control unit 140 controls the switches in the switch circuit 110 and in the rectified current 130 to be turned on or turned off, to cause that the target voltage can be lower than the input voltage. In this embodiment, a ratio of the target voltage to the input voltage may be 1:3.

It should be understood that, based on the same principle, the ratio of the target voltage to the input voltage can be related to the number of capacitors in the isolation circuit 120, and the number of switches in the switch circuit 110 and the number of switches in the rectifying circuit 130 change correspondingly.

An embodiment of the present disclosure also provides an electronic device, which includes the step-down circuit described in the aforementioned embodiments.

Figure 11:
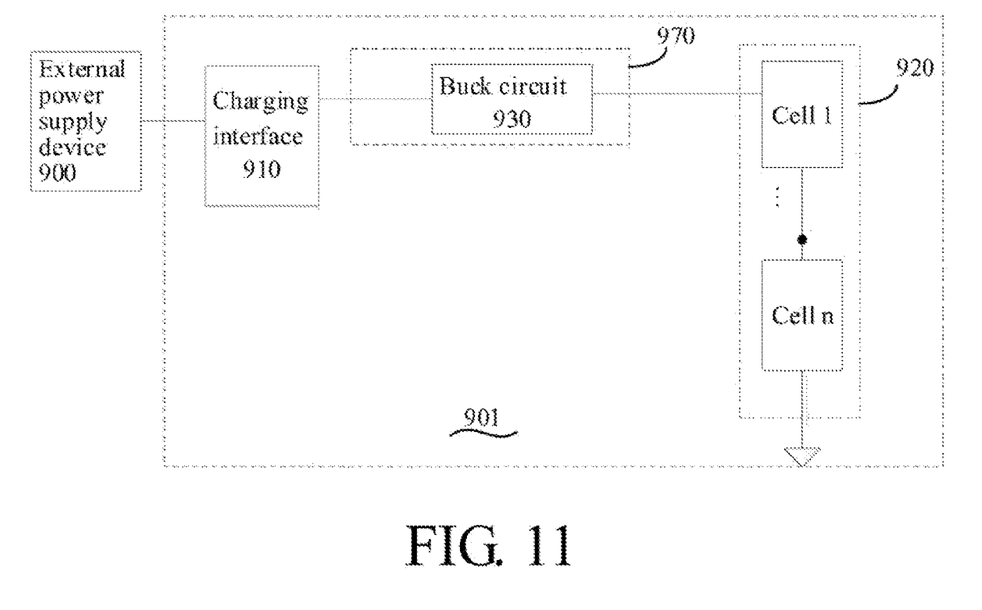
FIG. 11 is a structural block diagram of an electronic device in one embodiment.

As shown in FIG. 11, in an embodiment of the present disclosure, the electronic device 901 includes a charging interface 910, a load 920, and a first charging path 970. A step-down circuit 930 is provided in the first charging path 970.

The charging interface 910 is connected to a positive input terminal and a negative input terminal of the step-down circuit 930 and is used to receive an input voltage (or supply voltage) from an external power supply device 900. In one embodiment, the charging interface 910 includes charging interfaces, such as VBUS, USB+, USB−, and GND. In one embodiment, the external power supply device 900 may include a fast-charging charger (or fast-charging adapter) capable of providing fast charging for electronic devices and an ordinary adapter. For example, the fast-charging charger or fast-charging adapter can provide charging power greater than 15 W. The ordinary adapter can be an adapter that outputs 5V/1A, 5V/2A.

It should be noted that the present disclosure does not limit an interface type in the charging interface 910. For example, the charging interface 910 can be a Micro USB interface, a Type-C interface, a 30-pin interface, a lightning interface, and the like.

The load 920 is connected to the positive output terminal and the negative output terminal of the step-down circuit 930. The load 920 may be a single battery cell or a plurality of battery cells connected in series, and may also be a unit in the electronic device 901 that needs to be powered, for example, a processor, a camera module, and the like. In one embodiment, the number of battery cells included in the load 920 may be two, three, four, or more. The battery cell type of the load 920 may include at least one of a lead-acid battery, a nickel-hydrogen battery, a sodium-sulfur battery, a flow battery, a super capacitor, a lithium battery, a silicon negative lithium-ion battery, and a flexible battery. For example, the load 920 may include three lithium batteries connected in series, or the load 920 may include four lithium batteries connected in series.

In some embodiments, the load 920 may also include only one battery cell, which is not limited in the embodiment of the present disclosure.

In one embodiment, an output voltage of each battery cell may be in a range of 2.0 to 4.4 volts. It should be understood that the output voltage of each battery cell in the load 920 can be equalized by an equalization module to equalize voltage signals among a plurality of battery cells. It should be noted that, in the present disclosure, a plurality can be understood as at least two (greater than or equal to two), that is, multiple is two, three, or even more.

When the load 920 of the electronic device 901 is charged or powered by the first charging path 970, because the output target voltage of the step-down circuit 930 is lower than the input voltage, the voltage provided by the external power supply device 900 can be reduced, thereby charging or supplying power to the load 920. In addition, because an isolation circuit is provided in the step-down circuit 930, the safety of charging or power supply can be improved.

Figure 12:
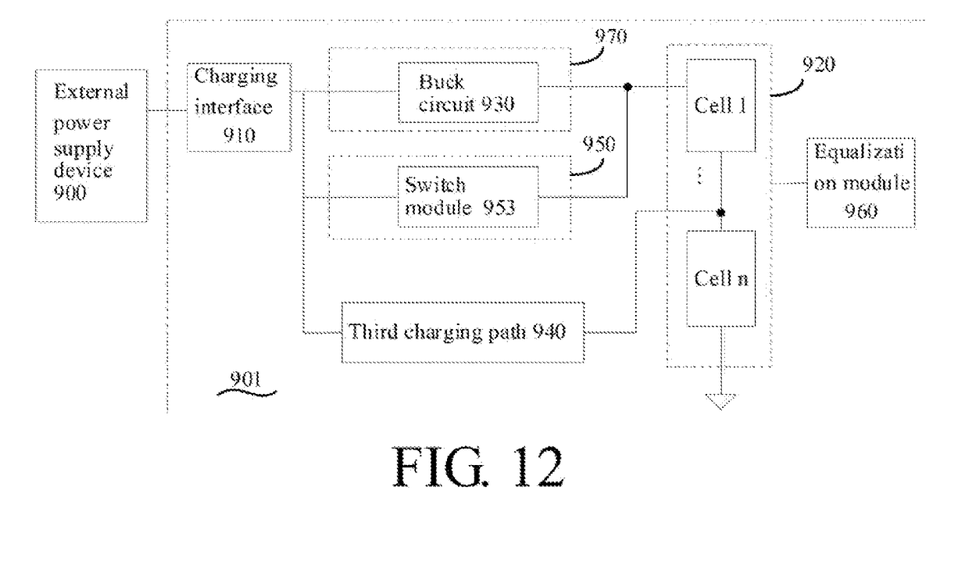
FIG. 12 is a structural block diagram of an electronic device in another embodiment.

As shown in FIG. 12, in an embodiment of the present disclosure, the electronic device 901 further includes a second charging path 950 and/or a third charging path 940. The second charging path 950 is provided with at least one switch module. The third charging path 940 is at least provided with a charging management circuit.

A control unit is used to determine, for a battery to be charged, a charging path among a first charging path 970, a second charging path 950, and a third charging path 940. It should be understood that the control unit and a control unit that controls the switch of the step-down circuit turning on or off may be the same component, or may be different components.

In an embodiment of the present disclosure, the control unit determines the charging path for battery charging according to a voltage value of a voltage received by a charging interface 910. When the voltage value received by the charging interface 910 is higher than a first threshold, it can be determined that the charging path for charging the battery cell is the first charging path. When the voltage value received by the charging interface 910 matches a charging demand voltage of the battery cell, it is determined that the charging path for charging the battery cell is the second charging path. When the voltage value received by the charging interface 910 is a predetermined value, it is determined that the charging path for charging the battery cell is the third charging path.

In some other embodiments of the present disclosure, the control unit is used to communicate with an external power supply device 900 to determine the charging path for charging the battery cell. A charging mode supported by the external power supply device 900 may include one of: a first charging mode, a second charging mode, and a third charging module. In the first charging mode, the external power supply device 900 can provide a charging voltage higher than the first threshold value. In the second charging mode, the external power supply device 900 can provide a charging voltage that matches the charging demand voltage of the battery cell. In the third charging mode, the external power supply device 900 can provide a charging voltage that is a predetermined value.

When it is determined that the external power supply device 900 supports the first charging mode, the charging path for battery charging is determined to be the first charging path. When it is determined that the external power supply device 900 supports the second charging mode, the charging path for battery charging is determined to be the second charging path. When it is determined that the external power supply device 900 supports the third charging mode, the charging path for battery charging is determined to be the third charging path.

In an embodiment, communication between an electronic device 901 and the external power supply device 900 may be two-way communication or one-way communication. The electronic device 901 and the external power supply 900 may communicate in a wired or wireless manner. When wired communication is used, a data line in the charging interface can be used. When wireless communication is used, Wifi, Bluetooth, and the like can be used.

When the electronic device 901 and the external power supply device 900 are in two-way communication, the communication can be initiated by the electronic device 901 or the external power supply device 900. For example, the external power supply device 900 first sends an instruction to the electronic device 901 to indicate a charging mode that the external power supply device 900 can support. The electronic device 901 determines the charging mode to be adopted according to the instruction and sends a feedback instruction. For example, if the external power supply device 900 indicates that the charging modes that the external power supply device 900 can support are the first charging mode and the third charging mode, and the charging mode that the electronic device 901 can support is the first charging mode, then the electronic device 901 may determine to adopt the first charging mode, send a feedback instruction, and make preparations for charging by using the first charging path 970. After the feedback instruction is received, the external power supply device 900 outputs the supply voltage according to the first charging mode.

It should be understood that the aforementioned two-way communication is only an example, and the present disclosure does not be limited.

When the electronic device 901 and the external power supply device 900 are in one-way communication, the charging mode can be determined by the electronic device 901 or the external power supply device 900. For example, the external power supply device 900 may send an instruction to the electronic device 901 to inform the electronic device 901 that the external power supply device 900 only supports the third charging mode, and the electronic device 901 receives the instruction as a preparation for charging by using the third charging path 940.

In the embodiment of the present disclosure, the first threshold value and the predetermined value are related to the material and quantity of the battery cell. For example, when the battery cell is a single battery cell and the battery cell is a lithium-ion battery, the first threshold may be set to 5V, and the predetermined value may also be set to 5V. When the battery cell is double battery cells in series and the battery cell is a lithium-ion battery, the first threshold can be set to 10V. Namely, when the double battery cells are connected in series, if the external power supply device 900 can provide a supply voltage higher than 10V, it can be charged through the first charging path. In the case of a single battery cell, if the external power supply device 900 can provide a supply voltage higher than 5V, it can be charged through the first charging path.

The charging management circuit provided in the third charging path, for example, may be a charging IC. It can include integration of circuits, such as LDO circuits (regulator circuits), and buck/boost circuits, which can charge or provide power to the load after the received current/voltage is adjusted. In an embodiment of the present disclosure, when the voltage received by the charging interface is 5V, the third charging path 940 is used to charge the battery cell. For example, when the voltage received by the charging interface is 5V/1A or 5V/2A, the third charging path 940 is used to charge the battery cell.

In the embodiment of the present disclosure, when the first charging path 970 is used to charge the battery cell, because the target voltage outputted by the step-down circuit 930 and the input voltage satisfy a certain relationship, for example, 1:2 and 1:3 described in the above embodiment. Therefore, when the first charging path 970 is determined to be used to charge the battery cell, the control unit is also used to obtain charging information of the battery cell and to feed the charging information back to the external power supply device 900, for the external power supply device 900 to adjust the supply voltage and/or supply current provided to the electronic device 901, such that the target voltage outputted by the power supply circuit 930 meets a charging demand voltage of the battery cell.

In the embodiment of the present disclosure, when it is determined that the second charging path 950 is used to charge the battery cell, the control unit is also used to obtain the charging information of the battery cell and to feed the charging information back to the external power supply device 900, for the external power supply device 900 to adjust the supply voltage and/or supply current provided to the electronic device 901. When the second charging path 950 is used to charge the battery cell, due to feedback of the charging information, the external power supply device 900 can adjust the supply voltage and/or the supply current to provide a voltage and current matching charging requirements of the battery cell. A switch module (e.g., a MOS transistor) for turning on and turning off charging is only provided in the second charging path 950. The charging voltage and current provided by the external power supply device 900 can be directly loaded on both ends of the battery cell after passing through the switch module to directly charge the battery cell.

When the second charging path 950 is used to charge the battery cell, the supply voltage that the external power supply device 900 can provide is not limited. As long as the external power supply device 900 can provide a voltage that matches the required voltage of the battery cell.

When the second charging path 950 is used to charge the battery cell, an independent control chip may be used to control a charging process. For example, the independent control chip may be used to perform a process of feedback of charging information. As a result, reliability and security of communication are improved.

It should be noted that the terms "direct," "direct-charging," "direct-loading," and "directly charge" used in the present disclosure may indicate that a charging voltage from the external power supply device 900 can match the required voltage of the battery cell, or indicate that the charging voltage from the external power supply device 900 can be loaded to both ends of the battery cell for charging without voltage conversion. Matching can be understood as the charging voltage from the external power supply device 900 can be equal to the required voltage of the battery cell, or within a predetermined variation range, for example, within tens of millivolts. By directly charging the battery cell, a charging speed of charging the battery cell using the second charging path 950 can be increased, and there is no need to provide a voltage conversion circuit in the second charging path 950, which can avoid charging heat caused by heat generated from the voltage conversion circuit.

In an embodiment, the above-mentioned charging information may be the voltage and/or current of the battery cell.

In an embodiment of the present disclosure, a charging interface included in the external power supply device 900 is a USB interface, in which a USB signal is a differential signal, and a signal line is D+, D−, D+, or D−, which can be provided with a fixed pull-up/pull-down resistor. USB 1.0/1.1/2.0 protocol defines high-speed/low-speed devices to meet the requirements of different situations. For example, D+ of a high-speed device is connected to a pull-up resistor with 1.5 k ohm that is not connected to D−; low-speed devices are the opposite. When the charging interface 910 of the electronic device 901 is connected to the external power supply device 900, the electronic device 901 can quickly identify the resistance value of the fixed resistor on D+ or D−, and then determine whether the external power supply device 900 is a fast-charging device. When the external power supply device 900 is a fast-charging device, a corresponding charging mode is the first charging mode or the second charging mode as mentioned above. If the external power supply device 900 is an ordinary charging device, the corresponding charging mode is the third charging mode as mentioned above.

As shown in FIG. 12, in an embodiment, the electronic device 901 further includes an equalization module 960, when the load 920 is a plurality of battery cells connected in series, the equalization module 960 equalizes the voltage or power between the plurality of battery cells.

In an embodiment, the equalization module 960 may include a plurality of equalization units, wherein each equalization unit is connected to one battery cell in series, i.e., one battery cell corresponds to one equalization unit. The equalization unit may adopt an equalization manner such as capacitive equalization, inductive equalization, and transformer equalization to equalize voltage signals of the plurality of battery cells.

In this embodiment, to achieve better advantages of the plurality of battery cells connected in series, such as discharging more power and having a longer service life, the equalization module 960 can be used to enable the voltage and current between the battery cells to be efficiently and timely equalized, thereby improving the overall performance of the battery cells and facilitating unified management of battery cells.

In the embodiment of the present disclosure, because the electronic device includes a step-down circuit, and an isolation circuit is provided in the step-down circuit, when the switches in the step-down circuit are broken down or fail, current and voltage can be prevented from flowing directly to a load, which can realize protection of the load and improve safety of charging. In addition, the electronic device of the embodiments of the present disclosure can adapt to different external power supply devices and flexibly use different charging paths to charge battery cells safely and quickly.

Any reference to memory, storage, database, or other medium used in the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM), which acts as external cache memory. As an illustration and not a limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The technical features of the embodiments mentioned above can be combined arbitrarily. Not all possible combinations of the various technical features in the embodiments mentioned above are described to make the description concise. However, as long as there is no contradiction in combinations of these technical features, all should be considered as the scope of the present specification.

The above-mentioned embodiments only express several embodiments of the present disclosure, and the descriptions are more specific and detailed, but should not be understood as limiting the scope of the present disclosure. It should be pointed out that for those of ordinary skill in the art, several modifications and improvements can be made, and these fall within the protection scope of the present disclosure, without departing from the concept of the present disclosure. Therefore, the protection scope of the present disclosure should be subject to the appended claims.

What is claimed is:

1. A step-down circuit, comprising:
   a positive input terminal and a negative input terminal for receiving an input voltage;
   a positive output terminal and a negative output terminal for outputting a target voltage, wherein the negative input terminal and the negative output terminal are grounded together;
   a switch circuit comprising at least one switch connected between the positive input terminal and the negative input terminal, wherein the switch circuit comprises a first switch (Q1), a second switch (Q2), and a third switch (Q3) connected in series between the positive input terminal and the negative input terminal;
   a rectifier circuit comprising at least one switch connected between the positive output terminal and the negative output terminal, wherein the rectifier circuit is a full-bridge rectifier circuit comprising a fourth switch (Q4), a fifth switch (Q5), a sixth switch (Q6), and a seventh switch (Q7), the fourth switch (Q4) and the fifth switch (Q5) are connected in series between the positive output terminal and the negative output terminal, and the sixth switch (Q6) and the seventh switch (Q7) are connected in series between the positive output terminal and the negative output terminal;
   an isolation circuit comprising at least one capacitor connected to the at least one switch in the switch circuit and the at least one switch in the rectifier circuit, wherein the isolation circuit comprises a first capacitor (C1) and a second capacitor (C2), one end of the first capacitor (C1) is connected to a common connection node between the first switch (Q1) and the second switch (Q2), the other end of the first capacitor (C1) is connected to a common connection node between the fourth switch (Q4) and the fifth switch (Q5), one end of the second capacitor (C2) is connected to a common connection node between the second switch (Q2) and the third switch (Q3), and the other end of the second capacitor (C2) is connected to a common connection node between the sixth switch (Q6) and the seventh switch (Q7); and
   a control unit configured to output control signals to control the at least one switch in the switch circuit to be turned on or off, and to control the at least one switch in the rectifier circuit to be turned on or off, to cause that the input voltage sequentially passes through the at least one switch in the switch circuit, the at least one capacitor in the isolation circuit, and the at least one switch in the rectifier circuit to obtain the target voltage, wherein a voltage value of the target voltage is lower than a voltage value of the input voltage.

2. The step-down circuit as claimed in claim 1, wherein the isolation circuit further comprises at least one inductor, that is connected to the at least one capacitor in series, for limiting a peak current of the at least one capacitor connected to the at least one inductor in series.

3. The step-down circuit as claimed in claim 1, wherein the voltage value of the input voltage is twice the voltage value of the target voltage.

4. The step-down circuit as claimed in claim 1, wherein the control unit is configured to generate the control signals to control the second switch (Q2), the fifth switch (Q5), and the sixth switch (Q6) to be turned off in response to the first switch (Q1), the third switch (Q3), the fourth switch (Q4), and the seventh switch (Q7) being controlled to be turned on, and to control the first switch (Q1), the third switch (Q3), the fourth switch (Q4), and the seventh switch (Q7) to be turned off in response to the second switch (Q2), the fifth switch (Q5), and the sixth switch (Q6) being controlled to be turned on.

5. The step-down circuit as claimed in claim 1 wherein the control signals are pulse width modulation (PWM) signals; and
   the control unit is configured to delay a predetermined duration before outputting the PWM signals each time.

6. An electronic device, comprising a step-down circuit comprising:
   a positive input terminal and a negative input terminal for receiving an input voltage;
   a positive output terminal and a negative output terminal for outputting a target voltage, wherein the negative input terminal and the negative output terminal are grounded together;
   a switch circuit comprising at least one switch connected between the positive input terminal and the negative input terminal, wherein the switch circuit comprises a first switch (Q1), a second switch (Q2), and a third switch (Q3) connected in series between the positive input terminal and the negative input terminal;
   a rectifier circuit comprising at least one switch connected between the positive output terminal and the negative output terminal, wherein the rectifier circuit is a full-bridge rectifier circuit comprising a fourth switch (Q4), a fifth switch (Q5), a sixth switch (Q6), and a seventh switch (Q7), the fourth switch (Q4) and the fifth switch (Q5) are connected in series between the positive output terminal and the negative output terminal, and the sixth switch (Q6) and the seventh switch (Q7) are connected in series between the positive output terminal and the negative output terminal;
   an isolation circuit comprising at least one capacitor connected to the at least one switch in the switch circuit and the at least one switch in the rectifier circuit, wherein the isolation circuit comprises a first capacitor (C1) and a second capacitor (C2), one end of the first capacitor (C1) is connected to a common connection node between the first switch (Q1) and the second switch (Q2), the other end of the first capacitor (C1) is connected to a common connection node between the fourth switch (Q4) and the fifth switch (Q5), one end of the second capacitor (C2) is connected to a common connection node between the second switch (Q2) and the third switch (Q3), and the other end of the second capacitor (C2) is connected to a common connection node between the sixth switch (Q6) and the seventh switch (Q7); and a control unit configured to output control signals to control the at least one switch in the switch circuit to be turned on or off, and to control the at least one switch in the rectifier circuit to be turned on or off, to cause that the input voltage sequentially passes through the at least one switch in the switch circuit, the at least one capacitor in the isolation circuit, and the at least one switch in the rectifier circuit to obtain the target voltage, wherein a voltage value of the target voltage is lower than a voltage value of the input voltage.

7. The electronic device as claimed in claim 6, wherein the electronic device further comprises:

a charging interface connected to the positive input terminal and the negative input terminal of the step-down circuit for receiving the input voltage from an external power supply device; and a load connected to the positive output terminal and the negative output terminal of the step-down circuit.

8. The electronic device as claimed in claim 7, wherein the load is a battery cell;

the electronic device comprises a first charging path, and the step-down circuit is provided in the first charging path;

the electronic device further comprises a second charging path and/or a third charging path, wherein the second charging path is at least provided with a switch module, and the third charging path is at least provided with a charging management circuit; and the control unit is configured to determine a charging path for charging the battery cell among the first charging path, the second charging path, and the third charging path.

9. The electronic device as claimed in claim 8, wherein the control unit is configured to determine a charging path for charging the battery cell according to the voltage value of the voltage received by the charging interface.

10. The electronic device as claimed in claim 9, wherein the control unit is configured to determine a charging path for charging the battery cell to be the first charging path in response to the voltage value received by the charging interface being higher than a first threshold.

11. The electronic device as claimed in claim 10 wherein the voltage value of the input voltage of the step-down circuit is twice the voltage value of the target voltage; and in response to the charging path for charging the battery cell adopting the first charging path being determined, the control unit is further configured to obtain charging information of the battery cell and to feed the charging information back to the external power supply device, for the external power supply device to adjust a supply voltage and/or a supply current provided to the electronic device, such that the target voltage meets the charging demand voltage of the battery cell.

12. The electronic device as claimed in claim 9, wherein the control unit is configured to determine a charging path for charging the battery cell to be the second charging path in response to the voltage value received by the charging interface matching a charging demand voltage of the battery cell.

13. The electronic device as claimed in claim 12 wherein in response to the charging path for charging the battery cell adopting the second charging path being determined, the control unit is further configured to obtain charging information of the battery cell, and to feed the charging information back to the external power supply device, for the external power supply device to adjust a supply voltage and/or a supply current provided to the electronic device.

14. The electronic device as claimed in claim 9, wherein the control unit is configured to determine a charging path for charging the battery cell to be the third charging path in response to the voltage value received by the charging interface being a predetermined value.

15. The electronic device as claimed in claim 8, wherein the control unit is configured to communicate with the external power supply device to determine the charging path for charging the battery cell;

a charging mode supported by the external power supply device comprises one of: a first charging mode, a second charging mode, and a third charging module, wherein the charging voltage that the external power supply device can provide is higher than a first threshold in the first charging mode, the charging voltage that the external power supply device can provide matches the charging demand voltage of the battery cell in the second charging mode, and the charging voltage that the external power supply device can provide is a predetermined value in the third charging mode;

the charging path for charging the battery cell being the first charging path is determined in response to the external power supply device supporting the first charging mode being determined, the charging path for charging the battery cell being the second charging path is determined in response to the external power supply device supporting the second charging mode being determined, and the charging path for charging the battery cell being the third charging path is determined in response to the external power supply device supporting the third charging mode being determined.

16. The electronic device as claimed in claim 7 wherein the load comprises at least two battery cells connected in series.

17. A step-down method, comprising:

receiving an input voltage via a positive input terminal and a negative input terminal;

outputting control signals to control one or more switches in a switch circuit to be turned on or off and to control one or more switches in a rectifier circuit to be turned on or off, to cause that the input voltage sequentially passes through the one or more switches in the switch circuit, one or more capacitors in an isolation circuit, and the one or more switches in the rectifier circuit to obtain a target voltage, wherein a voltage value of the target voltage is lower than a voltage value of the input voltage;

outputting the target voltage via a positive output terminal and a negative output terminal;

wherein the negative input terminal and the negative output terminal are grounded together; the switch circuit comprises at least one switch connected between the positive input terminal and the negative input terminal, wherein the switch circuit comprises a first switch (Q1), a second switch (Q2), and a third switch (Q3) connected in series between the positive input terminal and the negative input terminal; the rectifier circuit comprises at least one switch connected between the positive output terminal and the negative output terminal, wherein the rectifier circuit is a full-bridge rectifier circuit comprising a fourth switch (Q4), a fifth switch (Q5), a sixth switch (Q6), and a seventh switch (Q7), the fourth switch (Q4) and the fifth switch (Q5) are connected in series between the positive output terminal and the negative output terminal, and the sixth switch (Q6) and the seventh switch (Q7) are connected in series between the positive output terminal and the negative output terminal; and the isolation circuit comprises at least one capacitor connected to the one or more switches in the switch circuit and the one or more switches in the rectifier circuit, wherein the isolation circuit comprises a first capacitor (C1) and a second capacitor (C2), one end of the first capacitor (C1) is connected to a common connection node between the first switch (Q1) and the second switch (Q2), the other end of the first capacitor (C1) is connected to a common connection node between the fourth switch (Q4) and the fifth switch (Q5), one end of the second capacitor (C2) is connected to a common connection node between the second switch (Q2) and the third switch (Q3), and the other end of the second capacitor (C2) is connected to a common connection node between the sixth switch (Q6) and the seventh switch (Q7).

* * * * *